United States Patent [19]

Hofmann

[11] 4,414,845

[45] Nov. 15, 1983

[54] FUEL INJECTION NOZZLE, PARTICULARLY FOR DIESEL ENGINES

[75] Inventor: Karl Hofmann, Remseck, Fed. Rep. of Germany

[73] Assignee: Robert Bosch GmbH, Stuttgart, Fed. Rep. of Germany

[21] Appl. No.: 368,881

[22] Filed: Apr. 15, 1982

[30] Foreign Application Priority Data

May 6, 1981 [DE] Fed. Rep. of Germany ....... 3117779

[51] Int. Cl.³ ........................................... G01M 15/00

[52] U.S. Cl. ................................ 73/119 A; 200/83 Q

[58] Field of Search ............. 73/119 A; 200/DIG. 17, 200/DIG. 31, 83 Q; 239/533.2, 584, 585, 533.3

[56] References Cited

U.S. PATENT DOCUMENTS 4,181,010 1/1980 Knape et al. ..................... 73/119 A 4,359,895 11/1982 Wolff et al. ...................... 73/119 A

*Primary Examiner*—Jerry W. Myracle

*Attorney, Agent, or Firm*—Frishauf, Holtz, Goodman & Woodward

[57] ABSTRACT

A fuel injection valve with an electrical terminal signalling when the injection opens includes a second switch which is serially connected, electrically, with the needle valve so that the needle valve (15) can break an electrical circuit upon first lifting off the valve seat (16,17), full movement of the needle valve even upon engagement with the housing (10,11,12) still leaving an open circuit condition of an electrical terminal (49), although the needle valve body (15) re-engages the housing, by including a second switch (40,42; 51,52) serially with the switch formed by the valve cone and valve seat (17,16), the second switch including a movable second element (40,51) slidable with respect to a first fixed element (42,52) and moved by a push sleeve (28) or a push rod (70) with a dead or lost motion upon movement of the valve element (15) for a portion ($h_2$) of its full stroke ($h_1$) to then engage the movable second contact element and move it off the first contact element, and permit overtravel of the second contact element for the full stroke length ($h_1$) of the needle element (15), so that the electrical circuit between the needle valve (15) and the external terminal (49) will remain open although the needle valve again contacts the metallic housing (10,11,12) of the valve-nozzle combination.

10 Claims, 2 Drawing Figures

FUEL INJECTION NOZZLE, PARTICULARLY FOR DIESEL ENGINES

Figure 1:
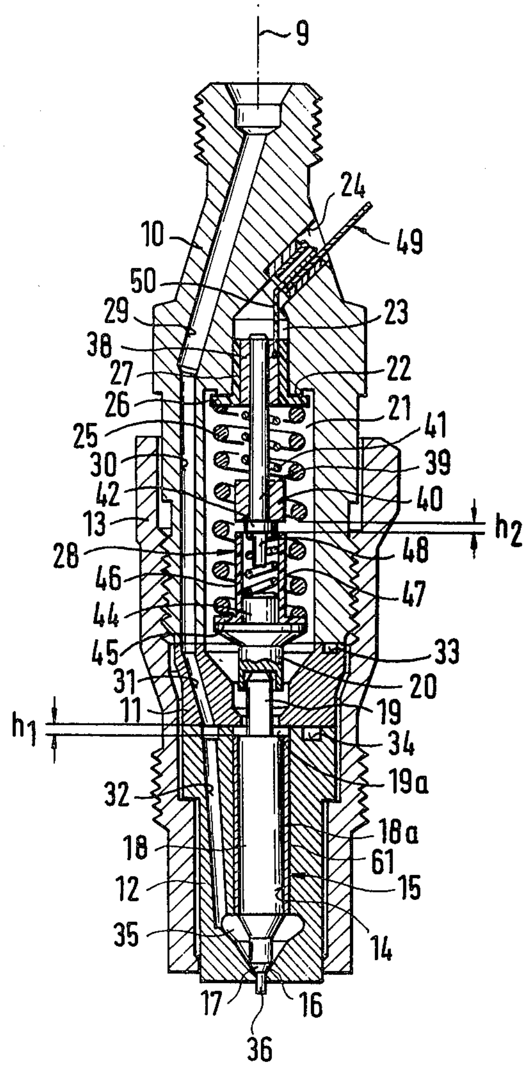

Cross Reference to Related Application, assigned to the Assignee of the present application, the disclosure of which is hereby incorporated by reference: U.S. Ser. No. 149,365 now U.S. Pat. No. 4,340,181, filed May 13, 1981 to which German patent disclosure document DE-OS No. 29 25 187 corresponds.

The present invention relates to fuel injection nozzles and more particularly to fuel injection nozzles which include therein electrical terminals or contacts to provide an electrical output signal representative of operation of the nozzle, so that electrical signals representative of injected fuel can be processed, and more particularly to such an injection nozzle suitable for use with Diesel engines.

BACKGROUND

The referenced U.S. application Ser. No. 149,365—which corresponds to published German patent disclosure document DE-OS No. 29 25 187—describes a nozzle which has a movable valve needle and, upon lifting off of the valve needle from a valve seat, interrupts an electrical circuit. The valve needle is electrically insulated from the remainder of the injection nozzle structure, except at the valve seat, so that lifting-off of the needle from the seat opens an electrical switch. The needle is lifted off the valve seat by hydraulic pressure. When the needle has reached its terminal lifted or raised position, it engages an abutment formed in the valve housing, so that the needle again makes electrical contact with the valve housing. This second connection, then, provides a second "closed" output signal which is superimposed over that of the first "open" or interrupting signal. Separating the two signals, which follow each other in rapid sequence, is difficult and requires additional electrical components. It has been proposed to provide an insulating bushing on the abutment in the housing against which the movable valve needle impinges. No suitable insulating material, however, has been found since coatings which are capable of accepting the impacts by the moving needle rapidly wear out and become non-insulating or other coatings, capable of accepting the forces, become deformed, so that the length of the stroke of the needle changes with change in the relative position of the abutment surface and the moving valve needle.

THE INVENTION

It is an object to improve an injection nozzle which has electrical switching capabilities representative of valve operation of the nozzle in such a way that the aforementioned disadvantages are avoided and which signals an "open" circuit, or "switch open" condition as soon as the valve opens, and continues to signal the "open" condition as long as the valve remains open.

Briefly, a second electrical switching element is provided, serially electrically connected with the switch formed by the valve seat and the valve needle, and located such that, upon lifting-off of the valve needle from the seat, the second switch interrupts the electrical circuit between the valve needle and the housing, the second switch remaining open after subsequent engagement of the valve needle with the valve housing at an abutment surface capable of accepting the impact of the moving needle. The second switch will remain open until the valve needle again returns to the valve seat. Preferably, the second switch opens as the needle traverses a portion of its entire needle stroke.

The structure has the advantage that the circuit leading to the injection nozzle is interrupted as soon as the needle lifts off the valve seat, so that the injection duration can be precisely determined and controlled. No additional circuit elements are required which compensate for the closing of the electrical circuit at the terminal end of the stroke of the needle. Those structures or components which determine the overall stroke of the needle can be made of materials which are dimensioned and designed solely to accept the mechanical forces of the moving needle valve, regardless of their electrical conductivity. Thus, the optimum materials from a mechanical and impact-resistant point of view can be selected.

Valves of standard construction can easily be modified in accordance with the present invention. In many such valves, the electrical circuit includes a contact spring which contacts a contact element, located in an insulating body in the valve member and, on the other, contacts the valve needle. In accordance with the present invention, it is only necessary to interpose a second switch element which includes a dead travel zone, for example by providing a movable counter contact element which is pressed against the contact body by a spring and is connected to a further terminal element which can be lifted off upon movement by the needle valve to interrupt continued connection of the contact spring to the needle valve if the needle valve has left its closed position, that is, is in engagement with the valve seat, and has passed a certain minimum stroke distance.

Long operating life and troublefree operation is insured by forming the contact element, in the preferred form of the invention, on the surfaces which are not necessary for contacts with an insulating coating. Preferably, the element is a metallic body with an insulating coating, for example a coating of aluminum oxide. Since this coating will not have to accept impact forces which stop movement of the valve needle, excellent longlift insulation and reliable operation is insured.

DRAWINGS

Figure 2:
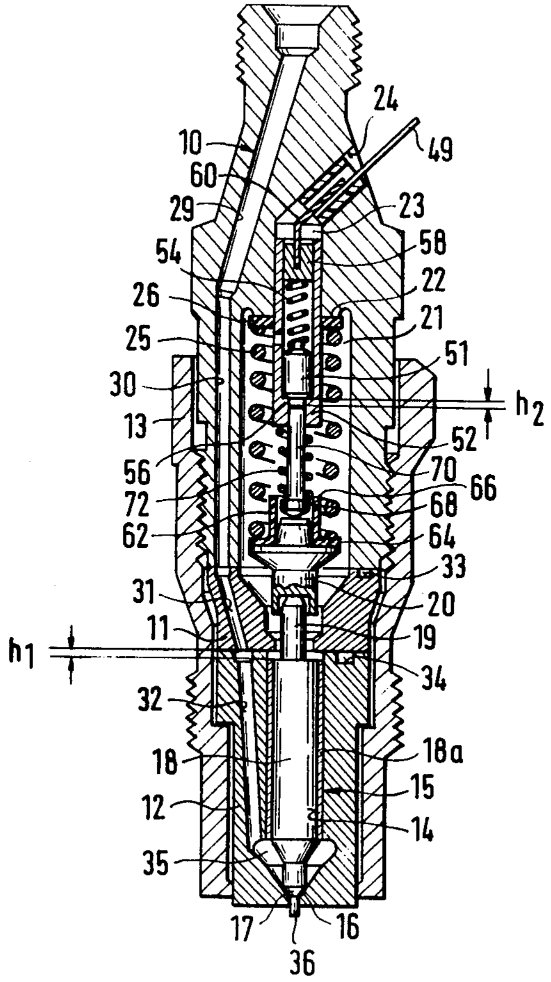

FIG. 1 is a schematic vertical axial sectional view through a fuel injection nozzle with an electrical contact element and including the features of the present invention, and FIG. 2 is a view similar to FIG. 1 and illustrating another embodiment.

The basic structure of a Diesel engine fuel injection valve is well known: essentially, the element is a rotation-symmetrical body made primarily of electrically conductive materials, the valve body and valving elements being made, for example, of steel, hard bronze, or the like, including if desired special inserts or components of hard materials to insure long life and reliable seating upon movement of the needle valve body of the injection nozzle.

The element is essentially rotation-symmetrical about an axis of symmetry 9, and includes a body or housing structure 10, an intermediate element 11, and a valve element 12. The respective elements are all held together by a coupling sleeve 13. The valve element 12 includes a guide bore 14 to receive a needle valve element 15, fitting against a valve seat 16, which cooperates with a sealing cone 17 of the valve 15.

The valve needle 15 includes a needle shaft 18 which has a wider diameter than the sealing or valve cone 17. The shaft 18 is slidable received in a guide bore 14, and terminates in a pressure accepting pin 19. The shaft 18 is insulated from the metal housing of the valve body 12 by placing an aluminum sleeve thereabout which has an anodized surface, or is otherwise insulated by anodizing, or an anodic oxidation process. A pressure receiving bushing 20 is fitted on a pressure pin 19. Bushing 20 has a lower extending sleeve-like portion receiving the pin 19, to provide some play and free movement between pin 19 and bushing 20. The abutment 19*a* formed by the difference between the diameter of the pin 19 and the shaft 18 is spaced, when the valve is closed, by a distance $h_1$ from an in-turned flange or shoulder of the intermediate plate 11 to define the maximum stroke of the valve element, that is, the distance by which the needle valve can lift off the valve seat 16.

A chamber 21 is formed within the valve body 10. The chamber 21 is open at the bottom and, at the upper side, has a shoulder 22, which narrows the opening therein to form an extension chamber 23, which communicates with a laterally outwardly leading bore or opening 24. The chamber 21 and bore 24 receive the electrical contact elements of the valve. A closing spring 25, capable of closing the valve unless the spring force is overcome by high hydraulic pressure, is received within chamber 21. The spring 25 is fitted against a disk 26 of insulating material, and forming part of an insulating bushing 27, engaging the shoulder 22. The other end of the spring 25 is fitted against a second insulating bushing 28 which engages the pressure bushing 20.

Fuel is supplied to the valve element as such by supply ducts 29,30,31,32 and ring ducts 33,34 to flow into a pressure chamber 35 of the valve element 12 as such. Chamber 35 is in communication with the nozzle opening 36 when the valve stem is lifted off the valve seat 16.

A metallic contact sleeve or bushing 38 is located within the insulating bushing 27. A bolt 39 is securely fitted with the sleeve 38. The bolt 39 is a guide element. It may be made of plastic, but is may also be made of metal which is externally insulated, for example as coated with an aluminum oxide or the like.

In accordance with the invention, a contact ring 40 is slidably positioned on the bolt 39. Contact ring 40 is pressed against a metallic flange 42 secured to the bolt 39. A spring 41, typically a spiral spring surrounding the bolt 39, is fitted on the one side against the contact ring 40 to press the ring 40 against flange 42 and, on the other side, engages the metallic sleeve 38. The flange 42 and the contact ring or sleeve 40, slidable on bolt 39, form a second switch which is serially connected, electrically, with the switch defined by the valve needle cone 17 and the valve seat 16.

In accordance with a feature of the invention, a pin 44 extends upwardly from the pressure receiving element 20, to receive an insulating bushing or sleeve 28 thereover. The bushing or sleeve 28 forms a receiving surface for the last loop or winding of the valve closing spring 25, for example a ring-shaped or circular loop thereof. The bushing or sleeve 28 has an upwardly extending cylindrical portion 46. The inner diameter of portion 46 is somewhat wider than the outer diameter of the flange 42 on the bolt 39. When the needle 15 is closed, the upper end of the cylindrical extension 46 is spaced from the lower surface of the contact ring by an axial distance $h_2$. The distance $h_2$ is somewhat less than the overall stroke of the valve needle, defined by the distance $h_1$.

A second contact spring 47 is located within the cylindrical portion 46 of the insulating bushing 28, with clearance or play, which engages on the one side of the flange 42 of the bolt 39 and on the other the pin 44 of the metallic pressure receiving element 20. The axial length of the flange 42 can be so dimensioned that the flange 42 is guided within, or guides the insulating bushing 28. The pin 39 is formed with an axial projection 48 to provide a seat and centering for the contact spring 47.

A terminal connector 49 for connection of an electrical evaluation apparatus, such as test apparatus, control apparatus or the like, in short, to receive an electrical signal representative of movement of the needle valve element is located in the bore 24 of the injection valve unit. The terminal 49 is insulated, of course, from the housing 10 of the injection valve. It is soldered to a connecting wire 50 which is electrically connected, for example by soldering or welding, with the metallic sleeve 38.

ELECTRICAL CIRCUIT terminal 49—wire 50—contact spring 41—contact ring 40—flange 42—second contact spring 47—pressure element 20—valve needle 15—needle cone 17—needle seat 16—valve body 12—intermediate element 11—coupling nut 13. The coupling nut, of course, being screwed into the motor housing would then be connected to ground, or chassis.

The switch elements, which are serially connected, are formed by break of contact between the needle cone 17 and the needle seat 16 and, for the second, serially connected switch, lifting of the ring 40 off flange 42.

OPERATION

Let it be assumed that the valve is installed in a motor vehicle and is in quiescent condition. The valve needle 15 is seated on the valve seat 16, in engagement with cone 17. This closes the first switch. Additionally, the contact ring 40 and the flange 42 are in engagement, pressed together by spring 41, forming the second switch. Upon introduction of oil under pressure sufficient to overcome the closing force of spring 25, the conical shape of the needle valve 15 will cause lifting thereof, that is, the needle valve is lifted off seat 16. This interrupts the closed circuit, and provides an output signal to the terminal 49 representative of beginning of injection of fuel. The needle will pass through its stroke $h_1$. Before the needle has finished its entire stroke $h_1$, however, the free edge of the cylindrical portion 46 of the insulating bushing 28 will, fitting over the flange 42 and overlapping the flange 42, engage the contact ring 40 and lift the contact ring 40 off the flange 42, thus interrupting, or breaking the circuit at the second switching point. The needle element 15 continues in its stroke, and when the full stroke $h_1$ is reached, the abutment surface 19*a* of the valve needle element 15 will engage the intermediate plate 11. This does not affect, however, the electrical circuit since the second switch formed by the flange 42 and the ring 40 has been opened. Thus, the terminal 49 will continue to have an OPEN signal thereon. The second switch 40,42 remains open until the pressure in chamber 35 drops and the valve 15 is moved downwardly by the valve closing spring 25. Upon the downstroke, the second switch formed by ring 40 and flange 42 will close first; this does not, however, close the entire electrical circuit because the first, serial switch then is open, the ring shoulder 19$a$ on the needle element 15 having left contact with the intermediate element 11 and not yet made contact at the valve seat and cone 16,17.

An electrical circuit, connected to terminal 49, thus will receive a signal which is accurately representative of the beginning and end of opening of the valve, that is, of the fuel injection process, thus permitting ready evaluation of the time during which the valve was open.

The valve of FIG. 2 is, basically, similar to that of FIG. 1, and similar parts have been given the same reference numeral. The only difference is the construction of the second switch, that is, the lost motion or dead motion, the respective moving elements having been reversed, that is rather than providing an upwardly extending sleeve which lifts off a ring engaging a central element, FIG. 2 illustrates an embodiment in which the central element is lifted off a ring-shaped contact.

A contact pin 51 is provided, slidably guided in a metallic bushing 52 and pressed by a contact spring 54 against a ring shoulder 56 formed on the inner wall of the bore within bushing 52. The bushing 52 is insulated at its entire circumference with an electrically insulating layer, for example aluminum oxide, and press fitted into the injection nozzle body 10. The inner wall of the bore of the bushing 52 is covered with an electrically insulating layer. A ring shoulder 56, however, in the inner facing wall of the bushing 52 are left metallic, that is, electrically conductive and form contact surfaces for current supply to the needle valve 15. Contact spring 54 engages with a contact stud 58, fitted into the body 10 and insulated therefrom, for example by the insulating surfaces of the bushing 52. A connecting wire 60 is connected to stud 58 for further connection to the terminal element 49, for example a standard vane, or other flat-type terminal.

An insulating sleeve 62 is fitted on the pressure receiving element 20. The insulating sleeve 62 has a flange 64, engaging the pressure element 20 and forming an engagement surface for the valve closing spring 25. A cylindrical extension 66 is formed on the bushing 62, which has a head 68, to guide a contact bolt 70, and to separate the contact bolt 70 from the closing spring 25. A second contact spring 72 engages the ring shoulder formed by the upper surface of the head 68, which, at the other end, engages the metallically exposed facing side of the bushing 52. Bolt 70 extends into a bore within the bushing 52. The length of the bushing 52, and the bolt 70, are so dimensioned that the upper facing end of the bolt 70 is spaced from the lower surface of the contact pin 51 by a distance $h_2$ when the needle valve is closed, that is, when needle 15 is seated on seat 16. The distance $h_2$, as in the example of FIG. 1, is somewhat less than the distance of the overall stroke $h_1$ of the valve needle 15. The head 68 of the bolt 70 is made of metal; the shaft of the bolt 70 may be made of metal or of plastic. If the shaft of the bolt 70 is made of metal, the surface facing the contact pin must be covered with an electrically insulating coating.

OPERATION

In quiescent condition, the elements are placed as shown in FIG. 2. Contact 51 is electrically connected to the terminal 49 through the contact spring 54 and the contact stud 58. The pin 51 engages the metallically exposed shoulder 56 of bushing 52. Further electrical contact is provided over the other facing metallically exposed side of bushing 52 and to the second contact spring 72 and from the contact spring 72 to the head of bolt 70 and then to the metallic pressure receiving element 20 and from then to the valve element 15.

Upon introduction of oil under pressure, that is, upon initiation of an injection event, valve needle 15 is lifted off the seat 16, thus interrupting the electrical contact formed between the cone 17 and seat 16. As the needle lifts, and when the stroke distance $H_2$ has been passed, bolt 70 engages contact pin 51 and thus lifts off the contact pin 51 from the metallically exposed shoulder 56, thus breaking the electrical circuit at this point. The second switch, therefore, is formed by the exposed metallic surface of the bushing 56 and contact pin 51. The needle element 15, however, is free to travel for its full stroke, that is, for the distance $h_1$ and engage with its shoulder 19$a$ against the intermediate element 11, without further affecting the electrical circuit condition, since the pin 51 will remain lifted off the metallic shoulder of bushing 56.

The second contact spring 72 could engage directly on the pressure element 20, thus permitting elimination of the head 68 and the bolt 70, so that head and bolt, together, can be made as a unitary plastic element. If the bolt 70 with the head 68 is used—as illustrated in FIG. 2—then it is desirable to apply a few turns of threading on the shaft of the bolt 70 in the region adjacent the head 68 and to screw contact spring 72 into these threads. The electrically insulating layer on the bushing 52, and possibly on the bolt 70 are suitably applied by hard coating. Preferably, a radial bore is formed in bushing 52 above the contact pin 51 to permit drainage of leakage oil which might reach chamber 21.

Various changes and modifications may be made and features described in connection with any one of the embodiments may be used with any other, within the scope of the inventive concept.

I claim:

1. Fuel injection valve and nozzle combination, for use in an internal combustion engine having a valve body (10,11,12) of electrically conductive material;

a needle valve element (15) of electrically conductive material formed with a valve cone (17) thereon;

a valve seat (16) formed on the valve body;

a valve spring (25) engaging the needle valve element to press the valve cone against the valve seat, and to seal the valve against injection of fuel and to establish an electrical contact between the needle valve element (15) and the valve body (10,11,12) and, upon lifting of the valve element during an injection stroke, to permit injection of fuel and to break the electrical contact so that the valve seat and valve cone will form a first electrical switch, and comprising, in accordance with the invention a second electrical switch (40,42; 51,52) electrically serially connected with said first switch, the second electrical switch being controlled by the needle valve element to open upon movement of the needle valve element (15) from the valve seat by a predetermined distance ($h_2$) corresponding to a portion of the injection stroke ($h_1$) of the needle valve element, and remaining open so long as the valve cone (17) of the needle valve element is spaced from the valve seat (16) by said predetermined distance.

2. Valve and nozzle combination as claimed in claim 1 including electrical terminal means (38,49,50; 58,60) located in the valve body, and insulated therefrom;

a connecting spring (41,54) in electrical contact with said terminal means;

and wherein, in accordance with the invention, the second electrical switch comprises a first contact element (42,52) and a movable second contact element (40,51), one of said contact elements being connected to said electrical terminal means;

and a connecting engagement element (28,70) engaging the movable second contact element and in operative, movement transferring engagement with the needle valve element (15) to separate the movable second contact element from the first contact element upon movement of the valve element (15) by said predetermined distance ($h_2$).

3. Valve and nozzle combination as claimed in claim 2 wherein the first contact element (52) comprises an elongated, essentially cylindrical body, and said movable second contact element (51) is slidably received within said essentially cylindrical body.

4. Valve and nozzle combination as claimed in claim 3 wherein said essentially cylindrical body has an inner surface which is insulated, and an in-turned flange (56) which has a conductive surface, said conductive surface forming said first contact element and forming the connecting surface for said movable second element (51) when the switch is closed, separation of said movable second element from the conductive surface opening the second switch.

5. Valve and nozzle combination as claimed in claim 4 further including a second connecting spring (72) in engagement with the in-turned flange (56) at the side opposite the movable second element (51), said second connecting spring being in engagement with a conductive surface of said flange;

and movement transmitting means (19,20; 68,70) in engagement with said needle valve element transmitting movement thereof from the needle valve element to said movable second contact element, said second connecting spring providing for electrical connection between the needle valve element and said in-turned flange when the valve cone (17) is seated on the valve seat.

6. Valve and nozzle combination as claimed in claim 5 wherein said movement transmitting means include a lost motion, or dead motion zone, spanning said predetermined distance ($h_2$) to move the second movable contact element (51) off the conductive surface of said in-turned flange upon movement of the needle valve element by said predetermined distance and permit overtravel of said contact element, after having broken the connection with the conductive surface of the movable valve element for the full stroke without reestablishing an electrical contact of said second switch.

7. Valve and nozzle combination as claimed in claim 6 wherein (FIG. 1) the second switch comprises a movable plug (40) and a connecting flange (42) in electrical connection with said terminal means (38,49,50);

and said connecting engagement element (28) comprises a sleeve operatively connected to said valve element (15) and surrounding said flange, with clearance, said sleeve being spaced from the plug by said predetermined distance to form a lost motion, or dead zone, upon movement of the valve element, travel beyond said predetermined distance of the valve element disengaging the plug (40) from the flange (42) and permitting overtravel of the needle valve element (15) beyond said predetermined distance and for the full stroke ($h_1$) thereof without reclosing of said second switch.

8. Valve and nozzle combination as claimed in claim 2 wherein the first contact element (42,52) and the movable contact element (40,51) are telescopically received metallic bodies;

and the facing surfaces of at least one of said metallic bodies is covered with an insulating layer or coating.

9. Valve and nozzle combination as claimed in claim 8 wherein said insulating layer or coating comprises aluminum oxide.

10. Valve and nozzle combination as claimed in claim 1 wherein said contacting spring (41,54) forms the electrical connection between the electrical terminal means (38,49,50; 58,60) and the respective movable second contact element (40,51).

* * * * *